Patented July 4, 1933

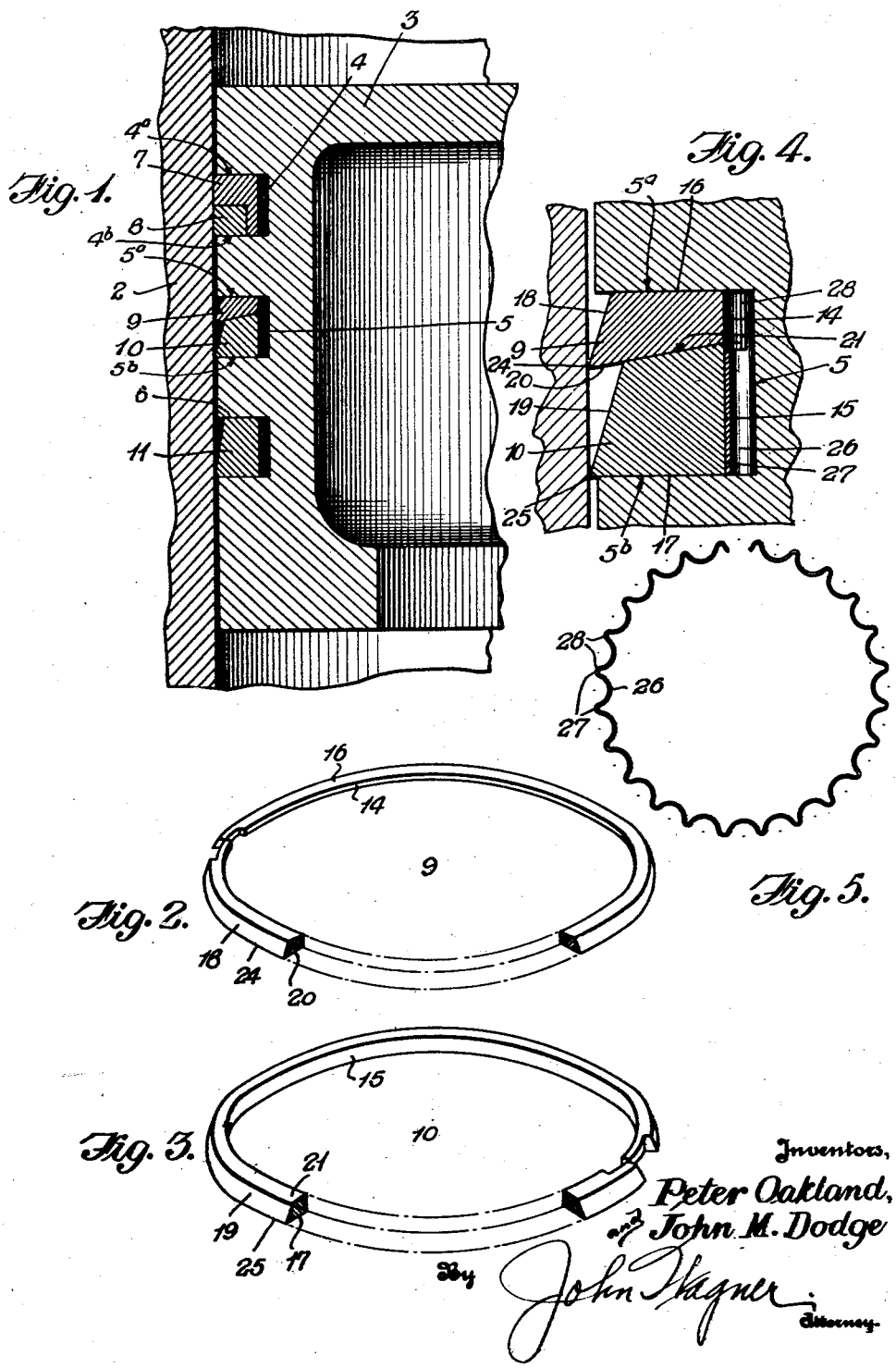

1,916,659

UNITED STATES PATENT OFFICE

JOHN MAYNARD DODGE, OF RYE, AND PETER OAKLAND, OF HOWARD BEACH, NEW YORK

SEALING RING

Application filed May 9, 1932. Serial No. 610,212.

The main object of the invention is to provide a sealing ring to be used as an auxiliary to a compression ring in an engine, pump, or like piston, to prevent oil or other vapors or an excess of lubricating oil from being sucked past the compression ring into the working chamber of the engine, pump, etc.

With this and other important objects in view, as will appear as the description progresses, reference will be had to the accompanying drawing, in which Fig. 1 is a vertical sectional view of a fragment of a piston and cylinder wall illustrating the relation of the various packing rings, Figs. 2 and 3 are perspective views of the sections of the sealing ring, Fig. 4 is an enlarged vertical sectional view of a portion of Fig. 1, and Fig. 5 is a top plan view of the spring backing ring.

In the drawing, reference number 2 designates a cylinder wall, 3 the piston, and 4, 5 and 6 three piston ring grooves. In the upper groove 4 is arranged a compression packing ring which may be of any effective type, though preferably of the type illustrated in Patent 1,750,381 dated March 11, 1930. The preferred compression ring comprises two sections 7 and 8 and because it presents no joints on top or at the back is very effective in preventing the passage of explosion or compression gases. A sealing ring composed of upper and lower sections 9 and 10 is located within the intermediate groove 5, while any type of scraper ring 11 may be placed in the bottom groove 6, the latter ring serving simply to scrape back the bulk of excess oil into the crank case.

Compression rings have come onto the market, which, as such, have rendered satisfactory service, but it has been found next to impossible when not commercially inexpedient to impart satisfactory sealing qualities thereto under all conditions and the present invention offers a sealing ring 9—10 to be used with an approved compression ring 7—8 without attempting to solve the intricate problem of incorporating sealing qualities in a compression ring.

Before going into the detailed construction of the sealing ring 9—10, it will be pointed out that on all motors, pumps, shock-absorbers and the like which employ conventional reciprocating pistons, there is at least one period when the pressure on the working or top side is reduced beyond that found on the "rear" or bottom side of the piston. For example, on the intake or suction stroke in an internal combustion motor, particularly if the throttle opening is restricted, the pressure within the combustion chamber will be less than that in the crank case. On this stroke, which is a down-stroke, the compression ring section 7 hugs the upper wall 4a of the groove 4, but at the end of the stroke, when the direction of piston movement reverses, the compression ring shifts position so that its lower ring section 8 hugs the bottom wall 4b of the groove 4. As this shifting takes place, the oil that collected against the bottom of the ring section 8, together with oil vapors, one or both, are sucked along the ring bottom, around its rear face, and over the upper ring wall into the working chamber. On each stroke, the lubricating oil and/or oil vapors, find their way, a little at a time, into the working chamber, there to be consumed or blown out, resulting in an expensive and unnecessary waste of lubricating oil. This undesirable flow of lubricant is stopped, except for an amount necessary to lubricate the upper or compression ring, by the provision of the sealing ring 9—10, which in no sense is a compression ring and could not satisfactorily be used as such since downward pressure of a compressed fluid thereagainst would tend to contract the same. When used beneath a compression ring the sealing ring 9—10 is never materially subjected to any such pressure.

In obtaining the desired sealing effect, the two piece ring 9—10 is constructed to hug at all times both upper and lower walls 5a and 5b, respectively, of the piston groove 5 thereby preventing the passage of oil or/and oil vapor around the ring. The inner edges 14 and 15 of both ring sections 9 and 10 respectively are parallel with the ring axis, the upper face 16 of the upper ring section 9 and the bottom face 17 of the lower ring section 10 are horizontal, i. e., parallel to a plane intersecting the ring axis at 90 degrees. The groove walls 5a and 5b are also parallel to this same plane. The outer faces 18 and 19 of the ring sections 9 and 10 respectively are beveled outwardly and downwardly forming acute angles with the bottoms 20 and 17 of the ring sections 9 and 10 respectively. The bottom wall 20 of the section 9 and the upper wall 21 of the section 10 are beveled outwardly and downwardly from their inner edges 14 and 15 respectively. In other words, the wall 21, considered in its entirety, forms a cone which seats in the conical cavity 20 of the upper ring section.

The upper ring section 9 is of less mass than the lower section 10, constituting about 40%, while the lower section 10 constitutes about 60% of the cross sectional area of the entire sealing ring. The greater mass in the ring section 10 gives it greater expanding force than is possessed by ring section 9. The ring section 10 may be further augmented, if desired, in its expanding action by a crimped spring backing ring 26, the points 27 of its crimps engaging the inner wall 15 of the ring section 10 and the portions intermediate the crimps engaging the inner wall of the groove 5. It is desirable to have this ring snugly fitted between the walls 5a and 5b, but not to exert force against the upper ring section 9 and to avoid this, the points 27 of the crimps are ground away as at 28 adjacent the ring section 9.

In use, the outer corners 24 and 25 of the ring sections 9 and 10 engage the cylinder wall 2. The lower ring section 10 constantly wedges outwardly forcing the upper section 9 upwardly and itself downwardly causing the walls or faces 16 and 5a and the walls or faces 17 and 5b to be at all times snugly engaged. The point 24 in wearing to a seat, permits the upper section to expand to maintain engagement with the cylinder wall, the corner 25 of the lower section 10 correspondingly wearing to a seat and permitting the section as a whole to wedge outwardly to maintain contact between the walls or faces 5a and 16, 20 and 21, and 5b and 17.

If the upper section 9, from any cause, fails to expand of its own accord to engage the cylinder wall 2, the lower section 10, because of its greater expansibility, plus the pressure of the spring packing ring 26 when such ring is used, will wedge outwardly and force the upper section 9 to expand and engage the cylinder wall 2. This condition may occur when the lower section 10 is already engaged with the cylinder wall, but the expansive pressure of the lower section 10 against the cylinder wall 2 will cause the corner 25 to soon wear sufficiently to allow the corner 24 of the upper ring to soon engage the cylinder wall. If the vertical wedging action causes the ring sections 9 and 10 to bind against the upper and lower groove walls 5a and 5b while only the corner 24 of the upper ring sections engages the cylinder wall, and not the corner 25 of the lower ring section 10, the parts remains so relatively until the upper corner 24 wears away sufficiently to let the corner 25 contact with the cylinder wall 2.

Thus it will be seen that at virtually all times the groove 5 is filled vertically and one of the corners 24 or 25, though generally both thereof, is at all times engaged with the cylinder wall.

On the down or "rear" stroke of the piston, the oil or other substance will be wiped back into the cylinder base. On the upstroke of the piston, the beveled outer faces 18 and 19 pass over the oil film on the cylinder wall, leaving wiping thereof from the cylinder wall to take place on the following down stroke of the piston.

Both ring sections 9 and 10 are split, and while stepped joints are illustrated, joints other than stepped ones may be adopted, the type of joint and degree of closure of the gap being varied according to how much oil is to be permitted to pass through the ring gaps to supply the compression ring 7—8 with a necessary amount of lubricant. Certain types of rings will not leave a sufficient amount of lubricant on the cylinder wall to fill the requirement of the compression ring, in which case the lubricant must be supplied through the gaps in the ring sections and the gap joints must be varied accordingly.

What is claimed is:

1. In combination with a cylinder, a piston within the cylinder and having an annular groove with parallel upper and lower walls, an oil ring within the groove, said ring comprising superposed interengaging sections, each section consisting of a ring integral throughout, the inter-engaging faces of the sections being conical and of the same inclination, the upper face of the upper section and the bottom face of the lower section being parallel and normally engaged with the upper and lower walls respectively of the piston groove, the outer edge of the upper face of the upper section terminating within the groove and the outer face of the upper ring section extending outwardly and downwardly and meeting the lower face of the upper ring section outside the plane of the piston side, the outer edge of the bottom face of the lower section terminating outside the piston groove and the outer face of the lower section extending upwardly and inwardly and meeting the upper face of the lower section within the plane of the piston side, the lower section being of considerably greater cross-sectional area and mass causing it to act as a wedge to force the upper section radially outward and to force both rings into engagement with the upper and lower walls of the piston groove.

2. In combination with a cylinder, a piston within the cylinder and having an annular groove with parallel upper and lower walls, an oil ring within the groove, said ring comprising interengaging superposed sections, each section consisting of a ring integral throughout, the inter-engaging faces of the sections being conical and of the same inclination, the upper face of the upper section and the bottom face of the lower section being parallel and normally engaged with the upper and lower walls respectively of the piston groove, the outer edge of the upper face of the upper section terminating within the groove and the outer face of the upper ring section extending outwardly and downwardly and meeting the lower face of the upper ring section outside the plane of the piston side, the outer edge of the bottom face of the lower section terminating outside the piston groove and the outer face of the lower section extending upwardly and inwardly and meeting the upper face of the lower section within the plane of the piston side, the lower section being of considerably greater cross-sectional area and mass causing it to act as a wedge to force the upper section radially outward and to force both rings into engagement with the upper and lower walls of the piston groove, and a crimped spring backing ring between both ring sections and the inner wall of the groove and having the points of its crimps omitted so the crimps will only engage the lower ring section.

In testimony whereof, we affix our signatures.

JOHN MAYNARD DODGE.
PETER OAKLAND.